(12) United States Patent
Gjerløv et al.

(10) Patent No.: US 8,749,084 B2
(45) Date of Patent: Jun. 10, 2014

(54) WIND TURBINE STAND STILL LOAD REDUCTION

(75) Inventors: Christian Gjerløv, Aarhus N (DK); Imad Abdallah, Aarhus C (DK); Brian Jørgensen, Hinnerup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 45 days.

(21) Appl. No.: 13/498,837

(22) PCT Filed: Sep. 24, 2010

(86) PCT No.: PCT/DK2010/050245
§ 371 (c)(1),
(2), (4) Date: May 10, 2012

(87) PCT Pub. No.: WO2011/035788
PCT Pub. Date: Mar. 31, 2011

(65) Prior Publication Data
US 2012/0217748 A1    Aug. 30, 2012

Related U.S. Application Data

(60) Provisional application No. 61/246,537, filed on Sep. 29, 2009.

(30) Foreign Application Priority Data

Sep. 28, 2009    (DK) .................................. 2009 70128

(51) Int. Cl.
F03D 7/04    (2006.01)
(52) U.S. Cl.
USPC .......................................................... 290/44

(58) Field of Classification Search
USPC .......................................................... 290/44
See application file for complete search history.

(56) References Cited

U.S. PATENT DOCUMENTS 4,298,313 A    11/1981    Hohenemser
7,436,083 B2 *  10/2008    Shibata et al. .................. 290/44
(Continued)

FOREIGN PATENT DOCUMENTS

DE    19717059 C1 *    7/1998    ................ F03D 7/02
EP    1890034 A1    2/2008
(Continued)

OTHER PUBLICATIONS

International Search Report for International Application No. PCT/DK2010/050245 dated Sep. 9, 2011.

(Continued)

Primary Examiner — Joseph Waks
(74) Attorney, Agent, or Firm — Patterson & Sheridan, LLP

(57) ABSTRACT

Methods and systems [are disclosed] for controlling wind turbines having a tower, a nacelle, and a rotor with a blade and hub. The wind turbine may further include a yaw drive system for rotating the nacelle relative to the tower about a substantially vertical axis, and/or a pitch drive system for rotating the blade of the rotor around a longitudinal axis of the blade. During high wind speeds when the wind turbine may be in a stand-still and non-power-producing situation, the yaw drive system may continuously or periodically rotate the nacelle to vary a direction of the rotor with respect to the wind. Further, the pitch drive system may continuously or periodically rotate the blade to vary a direction of the blade with respect to the wind. In this manner, the wind turbine may be safely controlled during high winds.

13 Claims, 3 Drawing Sheets

(56) References Cited

U.S. PATENT DOCUMENTS

| | | | |
|---|---|---|---|
| 7,919,880 B2 * | 4/2011 | Nielsen et al. | 290/44 |
| 8,057,158 B2 * | 11/2011 | Seidel et al. | 415/1 |
| 8,096,762 B2 * | 1/2012 | Risager et al. | 416/1 |
| 8,167,555 B2 * | 5/2012 | Yoshida | 416/32 |
| 8,183,707 B2 * | 5/2012 | Siebers et al. | 290/53 |
| 2004/0105751 A1 * | 6/2004 | Wobben | 415/4.1 |
| 2008/0304964 A1 | 12/2008 | Yoshida | |
| 2009/0081041 A1 | 3/2009 | Frese et al. | |
| 2009/0108582 A1 * | 4/2009 | Seibers et al. | 290/44 |
| 2009/0148285 A1 * | 6/2009 | Scholte-Wassink | 416/23 |
| 2009/0200804 A1 * | 8/2009 | Nielsen et al. | 290/44 |
| 2010/0014971 A1 * | 1/2010 | Risager et al. | 416/1 |
| 2010/0301604 A1 * | 12/2010 | Nielsen et al. | 290/44 |
| 2011/0311359 A1 * | 12/2011 | Bjork et al. | 416/1 |
| 2012/0107117 A1 * | 5/2012 | Godsk | 416/1 |

FOREIGN PATENT DOCUMENTS

| | | | | |
|---|---|---|---|---|
| EP | 2003335 A2 | 12/2008 | | |
| JP | 2006016984 A * | 1/2006 | | |
| WO | WO 0242641 A1 * | 5/2002 | | |
| WO | WO 2009068035 A2 * | 6/2009 | | F03D 7/02 |
| WO | WO 2011096078 A1 * | 8/2011 | | |

OTHER PUBLICATIONS

Danish First Technical Examination and Search Report for Danish Patent Application No. PA 2009 70128 dated May 12, 2010.

* cited by examiner

WIND TURBINE STAND STILL LOAD REDUCTION

TECHNICAL FIELD

The invention relates to a method of controlling a wind turbine comprising a tower, a nacelle located on the tower, and a rotor mounted on the nacelle and comprising a hub and at least one blade, the wind turbine further comprising a yaw drive system for rotating the nacelle in relation to the tower about a substantially vertical axis, and/or a pitch drive system for rotating the blade around a longitudinal axis thereof.

BACKGROUND

In very high wind speed conditions, wind turbines are shut-down and parked or allowed to idle. During such conditions, a primary concern is to avoid failure of turbine components, such as blades, due to extreme wind speeds. Edgewise vibrations in particular during stand still have been studied, see for example Christian Bak, Research in Aeroelasticity EFP-2006, Wind Energy Department, Riso National Laboratory, Technical University of Denmark, Roskilde, Denmark, July 2007. A number of suggestions have been put forward for strategies at extreme wind situations, such suggestions usually involving feathering the blades and/or yawing upwind turbines into a downwind position, see e.g. U.S. Pat. Nos. 7,204,673B2 and 7,436,083B2. It has also been suggested to monitor edgewise vibrations on turbines, and adjust blade pitch or yaw angle if edgewise vibrations are detected, see WO2009068035A2 and WO2009068036A2. However, it would be advantageous to further improve strategies at extreme wind conditions in order to safeguard turbines against damage.

SUMMARY

An object of the invention is to improve strategies for protecting wind turbines at extreme wind speeds in stand still or idling conditions.

It is also an object of the invention to make it possible to make wind turbine components lighter and/or cheaper while still being able to withstand extreme wind speeds in stand still or idling conditions, and by doing so decrease the cost of energy.

The objects are reached with a method of controlling a wind turbine comprising a tower, a nacelle located on the tower, and a rotor mounted on the nacelle and comprising a hub and at least one blade, the wind turbine further comprising a yaw drive system for rotating the nacelle in relation to the tower about a substantially vertical axis, and/or a pitch drive system for rotating the blade around a longitudinal axis thereof, the method comprising, during a stand-still, non-power-producing situation of the wind turbine due to high wind speeds, continuously or periodically rotating, by means of the yaw drive system, the nacelle so as to vary the direction of the wind in relation to the rotor, and/or continuously or periodically rotating, by means of the pitch drive system, the blade so as to vary the direction of the wind in relation to the blade.

The method is simple to put into practice, since it does not require any load or vibration monitoring during standstill. Also, by reducing the risk of critical loads, components can be made lighter and cheaper.

Preferably, the blade is rotated between two extreme angular positions. Preferably, the extreme positions are separated by no more than 45 degrees. It is preferred that the extreme positions are separated by no less than 5 degrees.

The objects are also reached with a method of controlling a wind turbine comprising a tower, a nacelle located on the tower, and a rotor mounted on the nacelle and comprising a hub and at least one blade, the wind turbine further comprising a yaw drive system for rotating the nacelle in relation to the tower about a substantially vertical axis, the method comprising determining at least one angular interval of the wind direction in relation to the nacelle as a non-critical load interval, and during a stand-still, non-power-producing situation of the wind turbine due to high wind speeds, continuously or periodically monitoring the wind direction, and rotating the nacelle so that the wind direction in relation to the nacelle is in the non-critical load interval.

Preferably, the method comprises repeating, for a plurality of yaw angles in relation to the wind direction, keeping the nacelle at the respective yaw angle, and monitoring the wind speed and edgewise oscillations of the blade, storing data on wind speed and edgewise oscillations obtained by said monitoring, and determining the at least one angular interval based on said stored data.

Preferably, the method comprises determining at least two angular intervals of the wind direction in relation to the nacelle as non-critical load intervals, and during a stand-still, non-power-producing situation of the wind turbine due to high wind speeds, continuously or periodically monitoring the wind direction, and rotating the nacelle so that the wind direction in relation to the nacelle is in one of the non-critical load intervals.

DESCRIPTION OF THE FIGURES

Below, embodiments of the invention will be described with reference to the drawings, in which.

DETAILED DESCRIPTION

Figure 1:
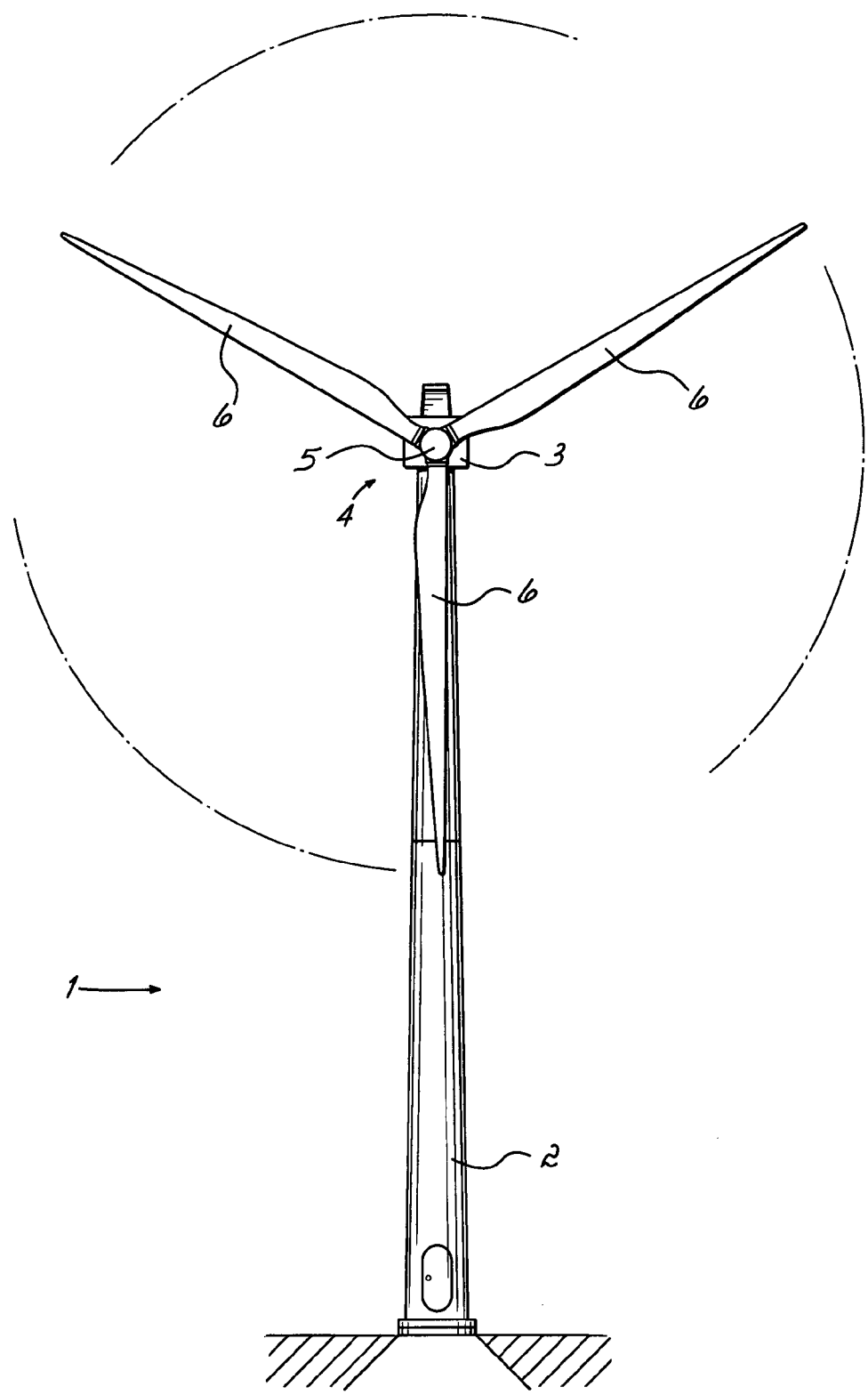
FIG. 1 shows a front view of a wind turbine.

FIG. 1 shows a wind turbine 1 comprising a tower 2, a nacelle 3 located on the tower 2, and a rotor 4 mounted on the nacelle 3 and comprising a hub 5 and three blades 6.

Figure 2:
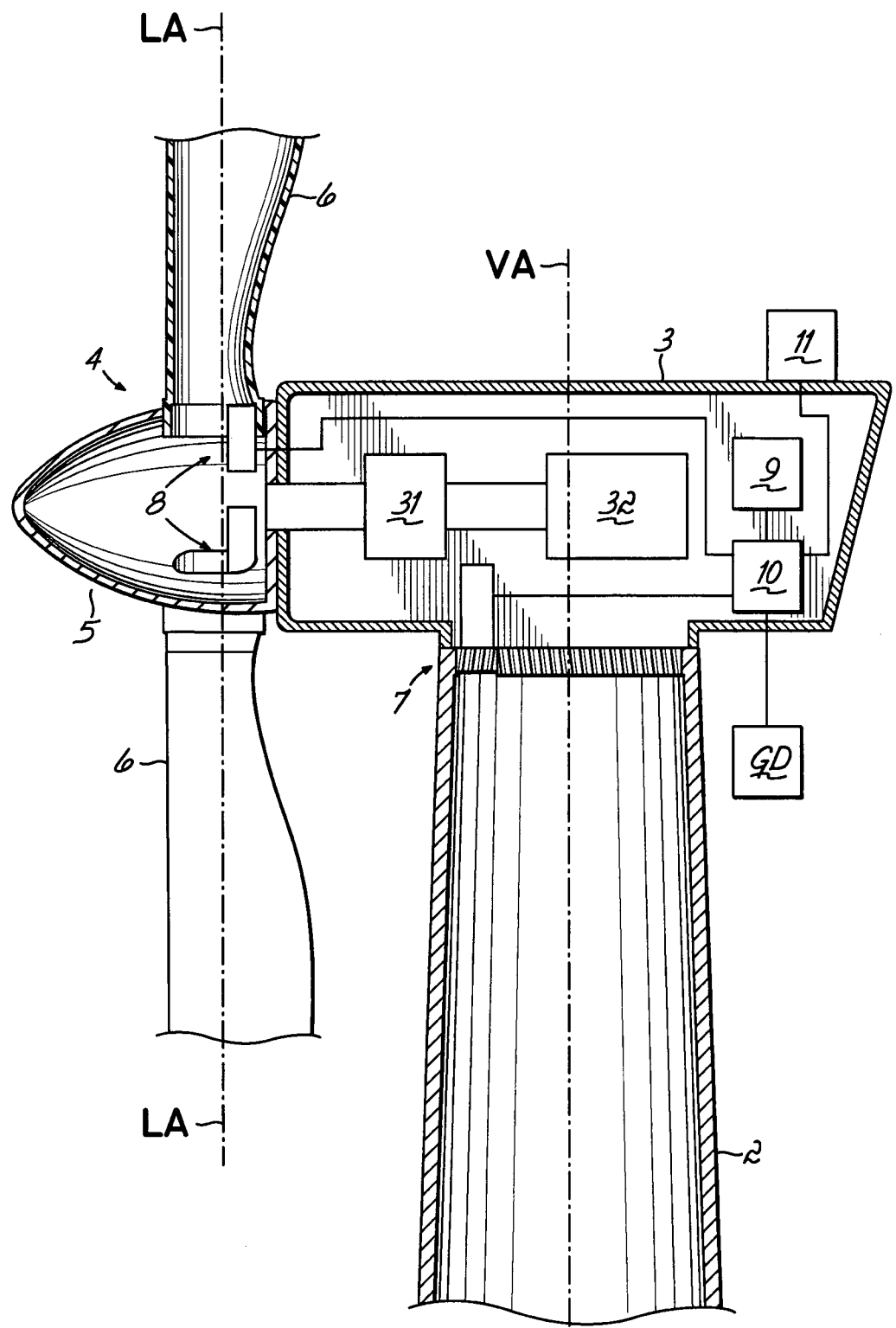
FIG. 2 shows a schematic vertical cross-section of a part of the wind turbine in FIG. 1.

Reference is made to FIG. 2. The nacelle 3 comprises a gearbox 31 and a generator 32, to which the rotor 4 is connected, which generator 32 is connected to a grid GD. The wind turbine further comprises a yaw drive system 7 for rotating the nacelle 3 in relation to the tower 2 about a substantially vertical axis VA, (indicated in FIG. 2 with a broken line). The wind turbine also comprises a pitch drive system 8 (electrical or hydraulic) for rotating the blades around their respective longitudinal axis, (indicated in FIG. 2 with broken lines LA). The yaw and pitch drive systems 7, 8 are adapted to be powered, during normal power-producing operation of the turbine, by power from the grid to which the turbine produces power. The yaw and pitch drive systems 7, 8 are also adapted to be powered by an alternative auxiliary power system, or backup system 9, which can supply power the grid power is not available. The backup system 9 could include for example batteries and an electrical power conversion unit, or an internal combustion engine (e.g. diesel engine) with a separate generator. The backup system 9 could be located in the turbine or outside the turbine. It could be turbine based (one backup system per turbine) or park based (one backup system common to a number of wind turbines).

The wind turbine also comprises a control unit 10 which is adapted to determine whether the yaw and pitch drive systems 7, 8 to be powered by the grid or the backup system 9, and to control the supply from these alternative power sources. The control unit 10 is also adapted to control the yaw and pitch drive systems 7, 8 based on signals from a wind measurement arrangement 11 providing data on wind speed and wind direction.

When the wind speed increases above a threshold value (e.g. 25 m/s), the rotor is stopped and parked, so as to provide a stand-still or idling, non-power-producing situation of the wind turbine. It is worth noting that the invention can be used regardless whether the rotor is locked with a brake or adapted to idle during extreme wind shutdown. During this non-power-producing situation, the yaw drive system 7 is controlled so that the nacelle 3 is continuously rotated so as to vary the direction of the wind in relation to the rotor 4. The nacelle could perform a reciprocating angular movement so that it is rotated a certain angular distance in one direction, and then rotated back in the other direction the same angular distance. This certain angular distance over which the nacelle is rotated back and forth is preferably at least 360 degrees, e.g. 360-1440 degrees. When the direction is changed, this could either be done without pausing, or, after the yawing movement in one direction has been stopped, there could be a pause of a predetermined time interval before the yawing movement in the other direction commences. Alternatively, the nacelle can rotate back and forth over an angular distance that is equal or less than 360 degrees, e.g. 30-360 degrees. In a further alternative, instead of being continuously moved, the nacelle 3 can be periodically rotated, so that it stays in a fixed position in relation to the wind direction for only a predetermined limited time, e.g. less than 30, 10 or 5 seconds, before it is moved in the same angular direction as the direction of the preceding movement to a new angular position.

Vibrations on wind turbine components during extreme wind speeds will vary significantly depending on the relative wind direction and the magnitude of the wind speed, (i.e. an increase in wind speed from 40 m/s to 50 m/s may provoke critical vibrations), and in some angular sectors, the loads will be more critical than in others. Rotating the nacelle in the described manner will avoid the turbine being in load critical areas of the relative wind direction for more than short durations. This will reduce extreme stand still loads, thus enabling lower component design loads and improved cost of energy.

In addition, or as an alternative, during a non-power-producing situation, the pitch drive system 8 is controlled so that the blades 6 are continuously rotated so as to vary the direction of the wind in relation to the blades 6. The blades can be rotated between two extreme angular positions, which for example could be separated by anywhere between 5 and 45 degrees. Preferably, one of the extreme angular positions is a fully feathered position, so as for the blades not moving past the fully feathered position. Such a blade pitching strategy could be carried out simultaneously as the yawing motion described above. Alternatively, the wind turbine could be adapted to perform said blade pitching strategy without performing the yaw pitch strategy, or vice versa.

Instead of being continuously moved, the blades 6 can be periodically rotated, so that they stay in a fixed position in relation to the wind direction for only a limited time, e.g. less than 30, 10 or 5 seconds, before they are moved in the same angular direction as the direction of the preceding movement to a new angular position. Rotating the blades in any of said manners will avoid them being in load critical areas of the relative wind direction for more than short durations.

Is understood that for the yaw and/or pitch movements during the non-power-producing situation, where grid power is not available, which could be the case during hurricanes, typhoons etc, the yaw and/or pitch drive systems 7, 8 are powered by the backup system 9.

Figure 3:
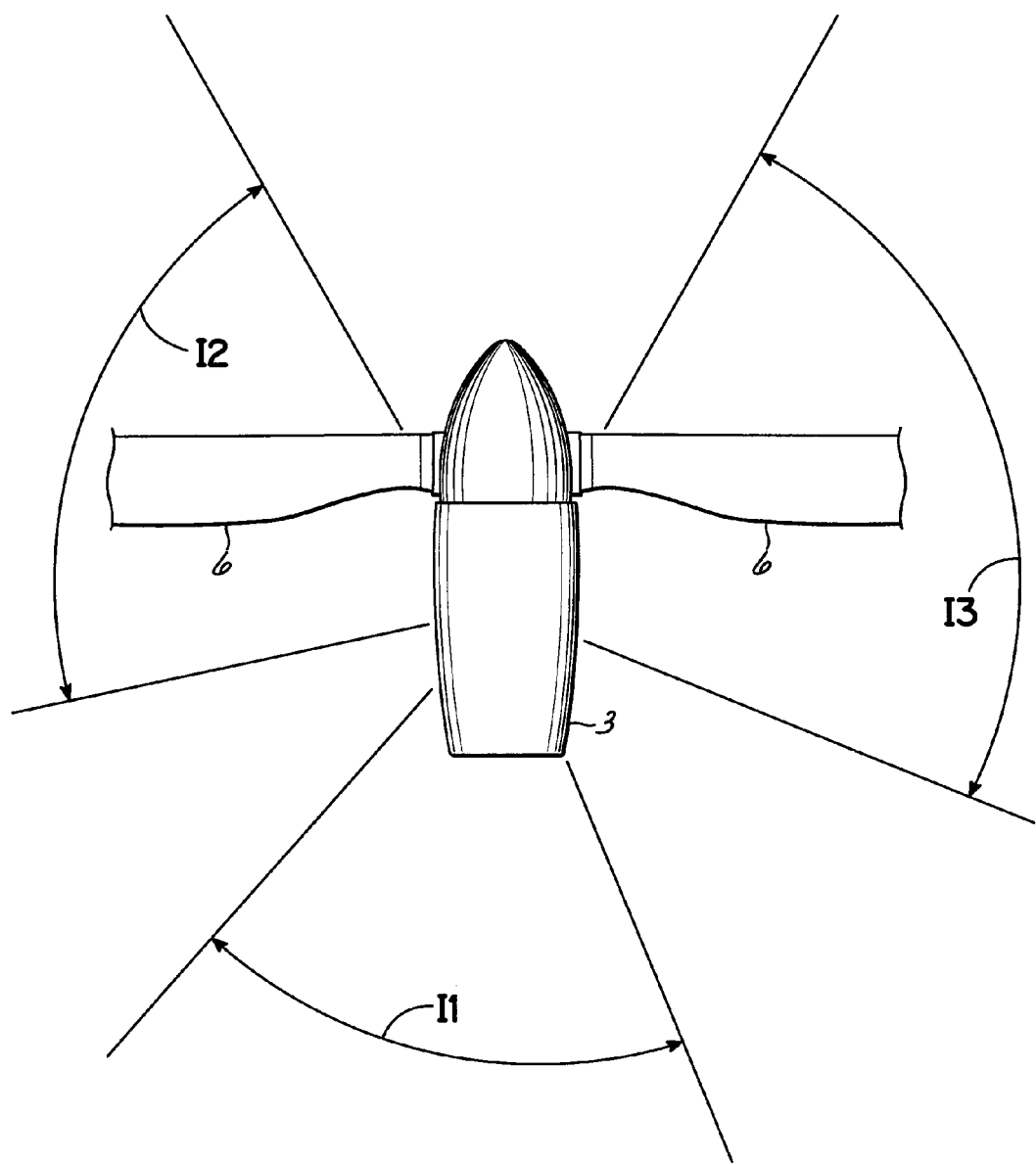
FIG. 3 shows a top view of a part of the wind turbine in FIG. 1.

Reference is made to FIG. 3. In another embodiment, for a specific wind turbine model, one or more angular intervals of the wind direction in relation to the nacelle 3 are determined as non-critical load intervals I1, I2, I3. Such non-critical load intervals I1, I2, I3 would differ between turbine models, as they would be dependent on model specific features of construction, materials, dimensions, eigenfrequencies, etc. In this example there are three such intervals of varying orientation and extension but more intervals could be established. The non-critical load intervals I1, I2, I3 could be established by numerical methods, and/or by testing on a wind turbine, for example on a prototype turbine. When the wind speed is high enough, e.g. above a predetermined level, the prototype turbine could be kept at a constant yaw angle in relation to the wind direction for a period of time and at which edgewise oscillations would be monitored. Then the turbine could be yawed a predetermined angular distance, e.g. 10 degrees, and the same monitoring operation could be performed again. This could be continued for all wind relative yaw positions separated by said predetermined angular distance, (e.g. 10 degrees), and for several critical wind speeds until enough data is collected for a representative analysis. Then the data could be analysed, in order to define critical threshold wind speeds and critical wind relative yaw positions. The non-critical load intervals I1, I2, I3 could then be set based on the critical yaw positions.

It should be mentioned that the non-critical load intervals can be site-calibrated. This would allow adjustment for local phenomena. For example, it could be that certain intervals, normally critical, are less critical at a certain site due to wake effects, but it could also be that certain intervals, normally non-critical, show to be more critical because of speed-up effects related to the local topography.

When the turbine is shutdown due to high winds, the wind direction is continuously or periodically monitored, and the nacelle is rotated so that the wind direction in relation to the nacelle and rotor is in one of the non-critical load intervals. It should be noted that at least a part of at least one of the intervals covers relative wind directions different from the direction of the rotor rotational axis, which is the direction usually chosen in prior art. The main parameters to establish the non-critical load intervals are the blade design, i.e. stiffness and strength, the extreme wind speed, inflow angles which result in blade stall induced vibrations due to low aerodynamic damping.

All embodiments above provide simple stand-still load mitigation strategies, which will make it possible to make turbine components lighter and cheaper, since they do not have to be equipped with special vibration dampening devices, or obtain dimensions otherwise required to withstand extreme wind speeds.

The invention claimed is:
1. A method of controlling a wind turbine, comprising:
providing the wind turbine including a tower, a nacelle rotatably disposed on the tower, and a rotor mounted on the nacelle, wherein the rotor comprising a hub and at least one blade;
rotating the nacelle in predetermined movements on the tower to vary a direction of the rotor in relation to a wind direction using a yaw drive system of the wind turbine; and rotating the at least one blade around a longitudinal axis of the at least one blade using a pitch drive system to vary a direction of the at least one blade in relation to the wind direction, wherein the wind turbine is in a stand-still and non-power producing situation due to high wind speeds.

2. The method according to claim 1, wherein the rotating the at least one blade comprises rotating the at least one blade between two extreme angular positions.

3. The method according to claim 2, wherein the two extreme angular positions are separated by no more than 45 degrees.

4. The method according to claim 2, wherein the two extreme angular positions are separated by no less than 5 degrees.

5. The method of claim 2, wherein one of the two extreme angular positions being a fully-feathered position.

6. The method of claim 1, wherein the continuously or periodically rotating the nacelle includes periodically rotating the nacelle so that the nacelle stays in a fixed position in relation to the wind direction for only a predetermined limited time before the nacelle is rotated in a same angular direction as a direction as a preceding rotation of the nacelle immediately before the predetermined limited time.

7. The method of claim 1, wherein the continuously or periodically rotating the at least one blade includes periodically rotating the at least one blade so that the at least one blade stays in a fixed location for only a predetermined limited time before the at least one blade is rotated in a same angular direction as a preceding rotation of the at least one blade immediately before the predetermined limited time.

8. The method of claim 1, wherein the high wind speeds being at least twenty-five meters per second.

9. A method of controlling a wind turbine, comprising:
providing the wind turbine including a tower, a nacelle located on the tower, and a rotor mounted on the nacelle, wherein the rotor comprising a hub and at least one blade;
determining at least one angular interval of a wind direction in relation to the nacelle as a non-critical load interval by monitoring edgewise oscillations for all wind relative yaw positions separated by a predetermined angular distance of at most one-hundred twenty degrees; and
during a stand-still and non-power-producing situation of the wind turbine due to high wind speeds, continuously or periodically monitoring the wind direction, and rotating the nacelle using the yaw drive system of the wind turbine so that the wind direction in relation to the nacelle is in the non-critical load interval, wherein the yaw drive system rotates the nacelle in relation to the tower about a substantially vertical axis.

10. The method according to claim 9, comprising determining at least two angular intervals of the wind direction in relation to the nacelle as non-critical load intervals, and during a stand-still, non-power-producing situation of the wind turbine due to high wind speeds, continuously or periodically monitoring the wind direction, and rotating the nacelle so that the wind direction in relation to the nacelle is in one of the non-critical load intervals.

11. The method of claim 9, further comprising powering the yaw drive system from a grid.

12. The method of claim 9, wherein the predetermined angular distance being at most thirty-six degrees.

13. A method of controlling a wind turbine, comprising:
providing the wind turbine including a tower, a nacelle located on the tower, and a rotor mounted on the nacelle, wherein the rotor comprising a hub and at least one blade;
determining at least one angular interval of a wind direction in relation to the nacelle as a non-critical load interval; and
during a stand-still and non-power-producing situation of the wind turbine due to high wind speeds, monitoring the wind direction, and rotating the nacelle using the yaw drive system of the wind turbine so that the wind direction in relation to the nacelle is in the non-critical load interval, wherein the yaw drive system rotates the nacelle in relation to the tower about a substantially vertical axis; and
repeating, for a plurality of yaw angles in relation to the wind direction, keeping the nacelle at the respective yaw angle, and monitoring the wind speed and edgewise oscillations of the at least one blade, storing data on wind speed and edgewise oscillations obtained by said monitoring, and determining the at least one angular interval based on the stored data.

* * * * *